Patented Jan. 29, 1946

2,393,609

UNITED STATES PATENT OFFICE 2,393,609

DIHYDRONORDICYCLOPENTADIENYL MONO-ETHERS OF POLYHYDRIC ALCOHOLS

Herman A. Bruson, Philadelphia, Pa., assignor to The Resinous Products & Chemical Company, Philadelphia, Pa., a corporation of Delaware No Drawing. Application March 25, 1944, Serial No. 528,166

11 Claims. (Cl. 260—611)

This invention relates to addition-rearrangement products of polyhydric alcohols and dicyclopentadiene, said products being dihydronordicyclopentadienyl ethers of polyhydric alcohols. More particularly, this invention is concerned with the dihydronordicyclopentadienyl monoethers of aliphatic polyhydric alcohols.

It is already known that ethers are obtained where dihydro-α-dicyclopentadiene is boiled with alcohols in the presence of selenious acid as an oxidizing agent (Alder and Stein, Liebig's Annalen der Chemie, 504, pages 207–209 (1933)). These known ethers are derivatives of dihydro-α-dicyclopentadiene-ol-3 and are formed as follows:

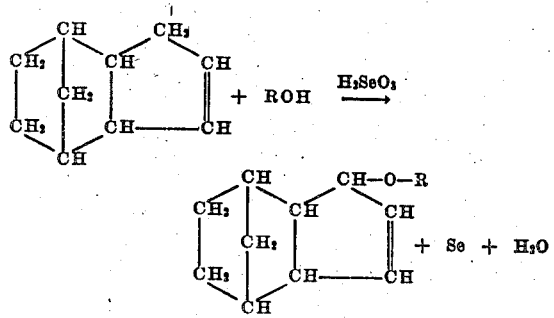

In accordance with the present invention, however, instead of the dihydro derivative, dicyclopentadiene itself is condensed in the presence of a non-oxidizing acidic condensing agent, for example, sulfuric acid or boron trifluoride, with a polyhydric alcohol whereby addition of one hydroxyl group of the polyhydric alcohol at the double bond of the bridged endomethylene cycle of the dicyclopentadiene occurs with a simultaneous molecular rearrangement of the latter to a hitherto unknown polycyclic ring system which, for the sake of brevity, is herein termed the "nordicyclopentadiene" ring system to distinguish it from the dicyclopentadiene ring system which is its precursor. The product obtained is a hydroxylated mono-ether of hydroxydihydronordicyclopentadiene and is formed in accordance with the following equation (using ethylene glycol as the simplest polyhydric alcohol), the formula for the isomers A or B representing the constitution of the product, of these A being the more probable:

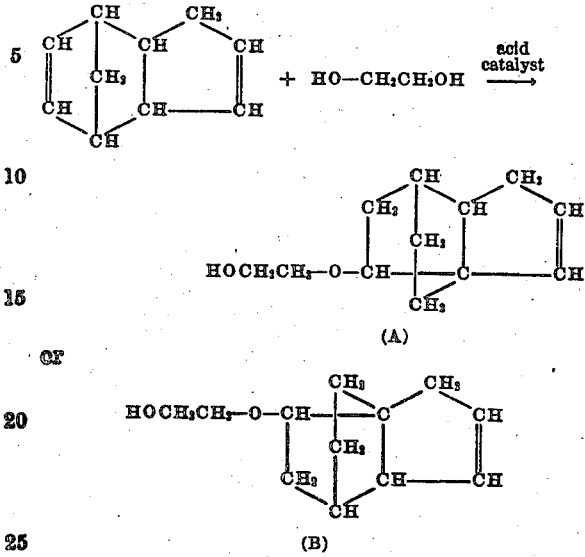

It will be seen that the new ethers obtained according to the present invention differ from the Alder and Stein ether in being formed by direct addition of the components of the alcohol to the double bonds without the loss of a hydrogen atom from the dicyclopentadiene nucleus, in having the ether group attached to a different ring than in the Alder and Stein alcohol, and in having a new ring system, namely, the "dihydronordicyclopentadienyl" ring system, as shown in formula (A) or (B) resulting from the complete transformation of the original dicyclopentadiene system. It will be noted that in the dihydronordicyclopentadienyl ethers obtained according to this invention, the ether oxygen atom is attached to an endoethylene cyclopentano group, forming one terminal cycle of the new system through a —CH— group flanked on one side by a —CH$_2$— group and on the other by a tertiary carbon atom, whereas in the known ethers of dihydro-α-dicyclopentadiene-ol-3 the ether oxygen atom is attached to a —CH— group flanked by two secondary —CH— groups, arrangements conferring entirely different chemical and physical properties to the respective ethers.

A most important chemical property of the new hydroxy ethers produced according to the present invention is their unique tendency to absorb oxygen from the air. This property is even more accentuated when the free hydroxyl groups are esterified with ether unsaturated carboxylic acids or polycarboxylic acids, the esters thus obtained being useful as synthetic drying oils.

Instead of ethylene glycol, other polyhydric alcohols may be used for the purpose of this invention. They may possess chains or cycles which are interrupted by one or more oxygen atoms and they may contain non-interfering substituents such as halogen, nitro, thiocyano, cyano, aryl, aralkyl, alkyl, alkylene, alkoxy, aryloxy, or cycloalkyl groups. Typical polyhydric alcohols which may be employed for the purpose of this invention include the alkylene glycols and polyalkylene glycols, for example, ethylene glycol, propylene glycol, trimethylene glycol, tetramethylene glycol, butylene glycol-1,2, pentamethylene glycol, hexamethylene glycol, decamethylene glycol, octadecane 1,12-diol, diethylene glycol, dipropylene glycol, triethylene glycol, tetraethylene glycol, hexaethylene glycol, nonaethylene glycol and higher polyethylene glycols, glycerol, polyglycerols, glyceryl-α-ethyl ether, glyceryl-α-phenyl ether, glycerol monochlorhydrin, glycerol monobromhydrin, dihydroxypropionitrile, g l y c e r o l monobenzyl ether, glycerolmonobornyl ether, trimethylol nitromethane, α,α-dimethylol-nitroethane, trimethylol-propane, pentaerythrite, sorbitol, mannitol, and the like.

Among the acidic condensing agents or catalysts which serve to promote the addition-rearrangment reaction are boron trifluoride and its coordination complexes with oxygenated compounds, sulfuric acid, its acid esters such as ethyl acid sulfate, aromatic sulfonic acids such as toluene sulfonic acid, aliphatic sulfonic acids such as butyl sulfonic acid, acidic salts such as zinc chloride, stannic chloride, titanium tetrachloride, antimonic chloride, aluminum chloride, ferric chloride, acidic siliceous clays such as those sold under the trade names of "Tonsil" or "Atapulgas," etc.

As examples of the coordination complexes of boron trifluoride, there may be cited those with ethers, typified by $BF_3.C_2H_5OC_2H_5$ and $BF_3.C_4H_9OC_4H_9$; with carboxylic acids, typified by $BF_3.2CH_3COOH$; with carboxylic esters, typified by $BF_3.2CH_3COOC_2H_5$; with ketones, typified by $BF_3.CH_3COCH_3$; with alcohols, typified by $BF_3.2C_4H_9OH$, and with water, which may be represented by $BF_3.(H_2O)_x$, $x$ being usually one or two.

The preferred catalysts are sulfuric acid and boron trifluoride or its coordination complexes. It is surprising to note that, though even in traces these catalysts promote polymerization of monomeric cyclopentadiene to resins in the absence of an alcohol, and also polymerize unsaturated ethers in general, they do neither to any appreciable degree in the case of a mixture of dicyclopentadiene and the polyhydric alcohols as described herein, but on the contrary promote the formation of highly reactive and useful unsaturated ethers by an addition-rearrangement reaction.

In general, only a small amount of catalyst is required, quantities of from 0.5% to 5% on the weight of the reactants being usually sufficient although more may be used.

The quantity of dicyclopentadiene used is advantageously one mol or less per mol of polyhydric alcohol, the products then being mostly mono-ethers containing only one dihydronordicyclopentadienyl group in the molecule together with smaller amounts of polyethers.

The addition-rearrangement reaction may be initiated by mixing the components and catalyst at temperatures even as low as 0° C. in some cases, or at room temperature, or at elevated temperatures. While it is generally desirable to control the temperature at the start, the reaction may be accelerated or carried to completion more rapidly by continuing the reaction for a long time or by raising the temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally useful, the best working range being 95° to 125° C. The reaction may be controlled by the rate of mixing the reactants and by the use of a solvent or diluent, such as a hydrocarbon solvent, including petroleum ethers or petroleum naphthas, or chlorinated hydrocarbons such as carbon tetrachloride, ethylene dichloride, tetrachlorethane, and the like.

After the reaction has been carried to the desired point, the acidic condensing agent is removed as by washing with water or neutralization with an alkali, or both. The reaction product may then be distilled in many cases or otherwise purified, as by treatment with decolorizing clay or carbon, stripping, extraction, etc.

The following examples illustrate this invention, it being understood that the term "dihydronordicyclopentadienyl" refers to the new polycyclic radical, $C_{10}H_{13}$—, represented by the following general formula:

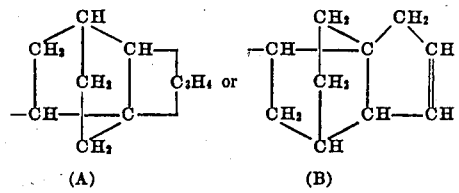

(A)     (B)

wherein $C_3H_4$ is a propenylene group which in conjunction with the two adjoining carbon atoms forms a cyclopenteno ring.

*Example 1*

(a) A mixture of 62 grams of ethylene glycol (1 mol), 132 grams pure dicyclopentadiene (1 mol), and 25 grams of $BF_3.C_2H_5$—O—$C_2H_5$ was stirred and gradually heated to 95° C. under a reflux condenser. After about fifteen minutes, an exothermal reaction set in which raised the temperature to 125° C. The mixture was heated at 95° C. for three hours after the exothermal reaction had subsided. It was then washed with hot water, neutralized with soda, dried, and distilled under reduced pressure. The β-hydroxyethoxydihydronordicyclopentadiene distilled at 125°–140° C./2 mm. as a colorless oil. The yield was 99 grams. Upon redistillation, it boiled at 152°–154° C./12 mm. and possessed the following constants: $N_D^{25}$ 1.5105; $d_4^{25}$ 1.085.

(b) Twenty grams of 95% sulfuric acid was added gradually to 93 grams of ethylene glycol while the mixture was cooled to 20° C. The solution was stirred and 139 grams of technical 95% dicyclopentadiene was added dropwise. The mixture was then heated at 60° C. for one hour and finally at 95° C. for two hours. The product was washed with hot dilute excess sodium hydroxide solution and the washed oil dried and distilled in vacuo. The β-hydroxyethoxydihydronordicyclopentadiene boiling between 110° and 120° C. at 1 mm. amounted to 115 grams.

Example 2

(a) A mixture of 106 grams of diethylene glycol and 132 grams of pure dicyclopentadiene was stirred at 60° C. and 25 grams of boron trifluoride-diethyl ether complex run in dropwise. The mixture was stirred for one hour at 60°–70° C., then for two and one-half hours at 70°–80° C., and finally for two hours at 95° C. The product was then washed with hot water, followed by a soda wash and a final water wash, and was distilled under reduced pressure. The fraction boiling at 150°–160° C./3 mm. was the desired β-hydroxyethoxyethoxydihydronordicyclopentadiene:

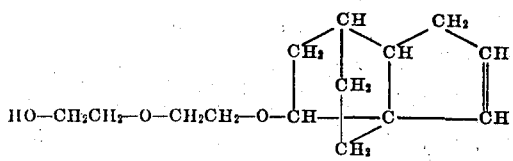

The yield was 102 grams. Upon redistillation, it boiled at 154°–158° C./3 mm. and possessed the following constants: $N_D^{25}$ 1.5029; $d_4^{25}$ 1.086.

(b) To a stirred solution of five grams of 98% sulfuric acid in 212 grams of diethylene glycol heated to 110° C., there was gradually added 280 grams of dicyclopentadiene. The mixture was then heated at 125° C. for four hours, washed with hot dilute sodium hydroxide solution, and the oil layer dried and distilled in vacuo.

There was obtained 252 grams of β-hydroxyethoxyethoxydihydronordicyclopentadiene as above, together with 74 grams of the diether,

boiling at 240°–250° C./1.5 mm., wherein $C_{10}H_{13}$ represents the dihydronordicyclopentadienyl radical.

Example 3

To a mixture of 92 grams of glycerol and 132 grams of dicyclopentadiene stirred at 55°–60° C., there was added dropwise 25 grams of boron fluoride-diethyl ether complex. The temperature was then raised to 70° and held at 70°–80° C. for three and one-half hours. The product was washed with hot water, with soda solution, then with water again, and distilled in vacuo. The dihydronordicyclopentadienyl mono-ether of glycerol,

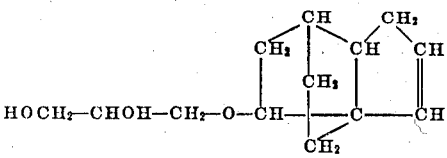

distilled over at 175°–185° C./2 mm. as a colorless viscous oil. The yield was 83 grams. Upon redistillation, it boiled at 175°–180° C./2 mm. and possessed the following constants: $N_D^{25}$ 1.5186; $d_4^{25}$ 1.136.

Example 4

To a stirred mixture of 152 grams of trimethylene glycol and fifteen grams of $BF_3.O(C_4H_9)_2$, there was added dropwise 280 grams of technical 95% dicyclopentadiene during the course of one hour while the reaction temperature was maintained at 100°–115° C. After all of the dicyclopentadiene had been added, the mixture was stirred for six and one-half hours at 115° C., washed with hot dilute sodium hydroxide solution, dried, and distilled in vacuo. The γ-hydroxypropyloxydihydronordicyclopentadiene,

is a colorless oil boiling at 135°–140° C./2.5 mm. and possessing the constants $N_D^{25}$ 1.5067; $d_4^{25}$ 1.0653.

Example 5

Dicyclopentadiene (204 grams) was added dropwise during one hour to a stirred heated mixture of ten grams of $BF_3.O(C_2H_5)_2$ and 155 grams of glyceryl-mono-α-methyl ether at 115°–120° C. After all of the dicyclopentadiene had been added, the mixture was stirred for six and one-half hours longer at 120°–125° C. The product was washed with dilute sodium hydroxide solution, dried, and distilled in vacuo.

The dihydronordicyclopentadienyl mono-ether of glycerol-mono-methyl ether,

distilled over at 155°–180° C./4 mm. Upon redistillation, the pure compound boiled at 145°–148° C./2 mm. The yield was 134 grams. It is a colorless oil having the constants $N_D^{25}$ 1.4991; $d_4^{25}$ 1.0822.

About 100 grams of the di-(dihydronordicyclopentadienyl) ether of glycerol,

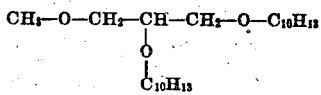

was also obtained as a pale yellow oil boiling at 215°–220° C./2.5 mm.

Example 6

A mixture of 228 grams of propylene glycol and 12 grams of boron trifluoride-di-n-butyl ether complex, $BF_3.O(C_4H_9)_2$, was added dropwise during the course of fifteen minutes to 420 grams of stirred dicyclopentadiene heated to 95° C., during which time the temperature rose to 110° C. After all had been added, the mixture was stirred and heated at 110°–115° C. for five and one-half hours, then washed with hot water and sodium hydroxide solution, washed again, dried, and distilled in vacuo.

The dihydronordicyclopentadienyl mono-ether of propylene glycol distilled over at 120°–130° C./2 mm. as a colorless oil in a yield of 369 grams. Upon redistillation, the pure compound boiled at 117°–120° C./1.5 mm. and has the constants: $N_D^{25}$ 1.0559; $d_4^{25}$ 1.5035.

A higher boiling liquid fraction (200°–220° C./2 mm.), amounting to 132 grams, was also obtained, corresponding to the di-(dihydronordicyclopentadienyl) ether of propylene glycol,

Example 7

To a stirred solution of 300 grams of triethylene glycol and 10 grams of $BF_3.O(C_2H_5)_2$ heated to 90° C., there was added dropwise 280 grams of dicyclopentadiene during the course of fifty minutes, during which time the temperature rose spontaneously to 125° C. After all of the dicyclopentadiene had been added, the mixture was stirred at 110°–120° C. for seven hours, then washed with hot water and with dilute sodium hydroxide solution, dried, and distilled in vacuo.

The desired dihydronordicyclopentadienyl-oxy-ethoxyethanol having the formula:

$C_{10}H_{13}$—O—$CH_2CH_2$—O—
$CH_2CH_2$—O—$CH_2CH_2OH$ distilled over between 170° and 200° C./2 mm. as a pale yellow oil in a yield of 285 grams.

Upon redistillation, the pure compound boiled at 185°–190° C./2 mm.

A higher boiling fraction, amounting to 105 grams, which distilled at 245°–250° C./2 mm. was also obtained, corresponding to the di-ether, $C_{10}H_{13}$—O—$CH_2CH_2$—O—
$CH_2CH_2$—O—$CH_2CH_2$—O—$C_{10}H_{13}$ wherein $C_{10}H_{13}$ represents the dihydronordicyclopentadienyl group.

*Example 8*

To a stirred mixture of 150 grams of dipropylene glycol and 156 grams of dicyclopentadiene heated to 95° C., there was added three grams of boron trifluoride dihydrate, $BF_3.2H_2O$. The mixture was then stirred at 110°–115° C. for seven hours, after which time it was washed with dilute sodium hydroxide solution, dried, and distilled in vacuo.

The dihydronordicyclopentadienyl mono-ether of dipropylene glycol,

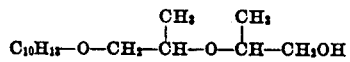

is a colorless oil boiling at 150°–154° C./1.5 mm.

*Example 9*

A mixture of 10 grams of dihydroxy-fluoboric acid, $BF_3.2H_2O$, and 291 grams of tetraethylene glycol was added dropwise during the course of one and one-half hours to 420 grams of dicyclopentadiene while the mixture was stirred and the reaction temperature was maintained at 115° C. After all had been added, the mixture was stirred for three hours longer at 120° C., then washed with hot water and sodium hydroxide solution, dried, and distilled in vacuo.

The dihydronordicyclopentadienyl mono-ether of tetraethylene glycol, $C_{10}H_{13}$—O—$CH_2CH_2$—O—
$CH_2CH_2$—O—$CH_2CH_2$—O—$CH_2CH_2OH$ distilled over between 205° and 250° C./2 mm. as a pale yellow oil in a yield of 262 grams. Upon redistillation, the pure compound boiled at 219°–224° C./1.5 mm.

A higher boiling fraction (boiling point, 280°–290° C./2 mm.) was also obtained, amounting to 94 grams and corresponding to the di-ether, $C_{10}H_{13}$—O—$C_2H_4$—O—$C_2H_4$—
O—$C_2H_4$—O—$C_2H_4$—O—$C_{10}H_{13}$ It is a pale yellow oil which, upon redistillation, gave the pure compound boiling at 270°–275° C./1.5 mm.

*Example 10*

To a stirred solution of 221 grams of glycerol monochlorhydrin and three grams of boron trifluoride-dibutyl ether complex, $BF_3.O(C_4H_9)_2$, heated to 100° C., there was gradually added dropwise 280 grams of dicyclopentadiene during the course of one hour while the reaction temperature was maintained at 102°–108° C. After all of the dicyclopentadiene had been added, stirring was continued for seven hours at 110°–115° C. The product was then washed with water, with dilute soda solution, finally again with water, then dried and distilled in vacuo.

The dihydronordicyclopentadienyloxy-chloropropanol,

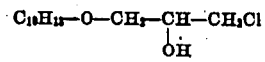

distilled over at 140°–160° C./1 mm. as a colorless oil in a yield of 237 grams. Upon redistillation, the pure compound boiled at 155° C./2 mm. and possessed the following constants: $N_D^{25}$ 1.5181; $d_4^{25}$ 1.149.

*Example 11*

A mixture consisting of 52.8 grams of pure dicyclopentadiene, 60 grams of 2-nitro-2-ethyl-propane-1,3-diol, and two grams of $BF_3.O(C_4H_9)_2$ was stirred at 50°–60° C. and gradually warmed to 80° C. After the mixture had been stirred for four hours at 80° C., the product was cooled, washed with dilute soda solution, then with water, and dried in vacuo. The residual oil, amounting to 90 grams, was distilled in vacuo.

The dihydronordicyclopentadienyl mono-ether of 2-nitro-2-ethyl-propane-1,3-diol,

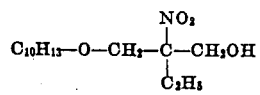

distilled over at 175°–180° C./2.5 mm. as a pale yellow oil in a yield of 40 grams. Upon redistillation, the pure compound boiled at 160°–170° C./2 mm.

*Example 12*

To a stirred mixture of 168 grams of glyceryl-α-phenyl ether and 132 grams of dicyclopentadiene heated to 75° C., there was added dropwise 10 grams of $BF_3$-dibutyl ether complex. The mixture was then heated for five hours at 110°–120° C. The dark, thick oil obtained was washed with hot dilute sodium hydroxide solution and with water, dried, and distilled in vacuo.

The dihydronordicyclopentadienyl mono-ether of phenoxy propanediol, $C_6H_5$—O—$CH_2$—CHOH—$CH_2$—O—$C_{10}H_{13}$ distilled at 185°–200° C./1 mm. as a colorless oil in a yield of 125 grams. Upon redistillation, the pure compound boiled at 185°–190° C./1 mm.

The hydroxylated mono-ethers of hydroxydihydronordicyclopentadiene are useful as solvents in printing inks and nitrocellulose lacquers, as intermediates for the preparation of resins and plastics, as plasticizers, as intermediates for soaps and wetting agents, as insecticides, and for many other purposes.

Chemically, they are very reactive, their residual double bond taking up halogen, thiocyanogen, and hydrogen. Their free hydroxyl groupings may be esterified with organic carboxylic acids or sulfuric acid to yield useful products. For example, their esters with oleic, maleic, linoleic, acrylic, and sebacic acids are autoxidizable materials capable of being utilized as varnishes.

This application is a continuation-in-part of copending application Serial No. 476,640, February 20, 1943.

I claim:

1. An acid-catalyzed, addition-rearrangement product of one mol of a polyhydric alcohol and one mol of dicyclopentadiene, said product being a dihydronordicyclopentadienyl mono-ether of the polyhydric alcohol, in which the alcohol group is attached through oxygen to a secondary carbon atom which is flanked by a methylene group and a tertiary carbon atom in an endoethylene cyclopentano group carrying a propenylene group forming a cyclopenteno group therewith.

2. An acid-catalyzed, addition-rearrangement product of one mol of an aliphatic polyhydric alcohol and one mol of dicyclopentadiene, said product being a dihydronordicyclopentadienyl mono-ether of the polyhydric alcohol, in which the alcohol group is attached through oxygen to a secondary carbon atom which is flanked by a methylene group and a tertiary carbon atom in an endoethylene cyclopentano group carrying a propenylene group forming a cyclopenteno group therewith.

3. An acid-catalyzed, addition-rearrangement product of one mol of ethylene glycol and one mole of dicyclopentadiene, said product being a dihydronordicyclopentadienyl mono-ether of ethylene glycol, in which the glycol group is joined through oxygen to a secondary carbon atom which is flanked by a methylene group and by a tertiary carbon atom in an endoethylene cyclopentano group carrying a propenylene group forming a cyclopenteno group therewith.

4. An acid-catalyzed, addition-rearrangement product of one mol of diethylene glycol and one mol of dicyclopentadiene, said product being a dihydronordicyclopentadienyl mono-ether of diethylene glycol, in which the glycol group is joined through oxygen to a secondary carbon atom which is flanked by a methylene group and by a tertiary carbon atom in an endoethylene cyclopentano group carrying a propenylene group forming a cyclopenteno group therewith.

5. An acid-catalyzed, addition-rearrangement product of one mol of glycerol and one mol of dicyclopentadiene, said product being a dihydronordicyclopentadienyl mono-ether of glycerol, in which the glycerol group is joined through oxygen to a secondary carbon atom which is flanked by a methylene group and by a tertiary carbon atom in an endoethylene cyclopentano group carrying a propenylene group forming a cyclopenteno group therewith.

6. A method for preparing an acid-catalyzed, addition-rearrangement product of one mol of dicyclopentadiene and one mol of a polyhydric alcohol, said product being a dihydronordicyclopentadienyl mono-ether of the polyhydric alcohol, which comprises reacting by bringing together at 0° to 145° C. a polyhydric alcohol and substantially one molecular equivalent of dicyclopentadiene in the presence of an acidic condensing agent.

7. A method for preparing an acid-catalyzed, addition-rearrangement product of one mol of dicyclopentadiene and one mol of an aliphatic polyhydric alcohol, said product being a dihydronordicyclopentadienyl mono-ether of the polyhydric alcohol, which comprises reacting by bringing together at 0° to 145° C. an aliphatic polyhydric alcohol and substantially one molecular equivalent of dicyclopentadiene in the presence of an acidic condensing agent.

8. A method for preparing an acid-catalyzed, addition-rearrangement product of one mol of dicyclopentadiene and one mol of an aliphatic polyhydric alcohol, said product being a dihydronordicyclopentadienyl mono-ether of the polyhydric alcohol, which comprises reacting by bringing together at 0° to 145° C. an aliphatic polyhydric alcohol and substantially one molecular equivalent of dicyclopentadiene in the presence of a boron trifluoride catalyst.

9. A method for preparing an acid-catalyzed, addition-rearrangement product of one mol of dicyclopentadiene and one mol of ethylene glycol, said product being a dihydronordicyclopentadienyl mono-ether of said ethylene glycol, which comprises reacting by bringing together at 0° to 145° C. ethylene glycol and substantially one molecular equivalent of dicyclopentadiene in the presence of a boron trifluoride catalyst.

10. A method for preparing an acid-catalyzed, addition-rearrangement product of one mol of dicyclopentadiene and one mol of diethylene glycol, said product being a dihydronordicyclopentadienyl mono-ether of said diethylene glycol, which comprises reacting by bringing together at 0° to 145° C. diethylene glycol and substantially one molecular equivalent of dicyclopentadiene in the presence of a boron trifluoride catalyst.

11. A method for preparing an acid-catalyzed, addition-rearrangement product of one mol of dicyclopentadiene and one mol of glycerol, said product being a dihydronordicyclopentadienyl mono-ether of said glycerol, which comprises reacting by bringing together at 0° to 145° C. glycerol and substantially one molecular equivalent of dicyclopentadiene in the presence of a boron trifluoride catalyst.

HERMAN A. BRUSON.